United States Patent

Yoshida et al.

[11] Patent Number: 6,071,608
[45] Date of Patent: Jun. 6, 2000

[54] TAPE-TYPE MAGNETIC RECORDING MEDIUM AND METHOD OF REPRODUCING SIGNAL BY USING THE TAPE MAGNETIC RECORDING MEDIUM

[75] Inventors: Shinya Yoshida, Miyagi; Kiyoshi Kagawa, Kanagawa, both of Japan

[73] Assignee: Sony Corporation, Tokyo, Japan

[21] Appl. No.: 08/959,847

[22] Filed: Oct. 29, 1997

[30] Foreign Application Priority Data

Oct. 31, 1996 [JP] Japan .................................... 8-290562

[51] Int. Cl.⁷ .................................................... G11B 5/66
[52] U.S. Cl. ...................... 428/332; 428/336; 428/694 R; 428/694 T; 428/694 TS; 428/692; 428/900; 427/128; 427/129; 427/130; 427/131; 360/113; 324/252
[58] Field of Search ................................ 428/694 R, 692, 428/694 T, 694 TS, 900, 336, 332; 427/128–131; 360/113; 324/252

[56] References Cited

U.S. PATENT DOCUMENTS

| | | | |
|---|---|---|---|
| 4,396,668 | 8/1983 | Saito | 428/220 |
| 4,424,459 | 1/1984 | Inomata | 307/415 |

*Primary Examiner*—Leszek Kiliman
*Attorney, Agent, or Firm*—Hill & Simpson

[57] ABSTRACT

A tape-type magnetic recording medium including a non-magnetic support member; and a magnetic layer formed on the non-magnetic support member, wherein relationship $Br\delta \leq Bst/2$ is satisfied when an assumption is made that the residual magnetic flux density of the tape-type magnetic recording medium is $Br$, the thickness of the magnetic layer is $\delta$, the saturated magnetic flux density of a magnetoresistance effect device for use in a shield-type magnetoresistance effect magnetic head serving as a reproducing head is $Bs$ and the thickness of the same is $t$, and coercive force $Hc$ of the tape-type magnetic recording medium satisfies $Hc \geq 1500$ (Oe).

4 Claims, 5 Drawing Sheets

TAPE-TYPE MAGNETIC RECORDING MEDIUM AND METHOD OF REPRODUCING SIGNAL BY USING THE TAPE MAGNETIC RECORDING MEDIUM

BACKGROUND OF THE INVENTION

1. Field of the Invention

The present invention relates to a tape-type magnetic recording medium for use in a shield-type magnetoresistance effect magnetic head, a method of manufacturing the tape-type magnetic recording medium and a method of reproducing a signal from the tape-type magnetic recording medium by using the shield-type magnetoresistance effect magnetic head.

2. Description of Related Art

In a filed of magnetic recording, dense recording has been required year by year because of enlargement of the quantity of information which must be recorded. As a result, magnetic recording mediums have been changed from so-called coating-type magnetic recording mediums of a conventional type having a structure, in which magnetic particles to be applied are dispersed in a binder, to so-called thin-film-type magnetic recording mediums having a structure in which a ferromagnetic metal film is formed by plating or vacuum thin-film forming means (a vacuum evaporation method, a sputtering method, an ion plating method or the like).

Since the thin-film magnetic recording medium having the formed ferromagnetic metal film exhibits large coercive force and excellent square ratio and capable of eliminating a necessity of mixing, to the magnetic layer thereof, a binder which is a non-magnetic material as has been required for the coating-type magnetic recording medium, the filling density of the magnetic material (namely, the quantity of magnetization per unit volume) can significantly be raised. Moreover, the thin-film magnetic recording medium is able to considerably reduce the thickness of the magnetic layer as compared with the coating-type magnetic recording medium. Therefore, an excellent electromagnetic conversion characteristic can be realized in the short wavelength region. In addition, the thin-film magnetic recording medium has another characteristic in that demagnetization occurring during a recording operation can significantly be prevented. Since the thin-film magnetic recording medium has various advantages as compared with the coating-type magnetic recording medium as described above, it can be considered that the thin-film magnetic recording mediums will be a main portion of the high density magnetic recording mediums.

In the industrial field of the magnetic recording, the thin-film magnetic recording medium has been in the form of a tape-type magnetic recording medium having a magnetic layer formed by a diagonal evaporation method. The tape-type magnetic recording medium formed by the diagonal evaporation method is formed by depositing a magnetic metal material on a moving non-magnetic support member (which is a polymer film, such as a polyester film, a polyamide film or a polyamide film) from a diagonal direction by the vacuum evaporation method. The tape-type magnetic recording medium formed by the diagonal evaporation method has a structure such that magnetic particles are oriented diagonally with respect to the surface of the non-magnetic support member. Therefore, higher recording can be performed as compared with the conventional magnetic tape in which the magnetic particles are oriented in the lengthwise direction. Specifically, the above-mentioned tape-type magnetic recording medium has a structure that the axis of easy magnetization in the magnetic layer is inclined by about 20° from the surface of the non-magnetic support member.

To meet the requirement for raising the density in recording, the magnetic head must be improved as well as the improvement in the magnetic recording medium. In particular, a reproducing method adapted to a magnetoresistance effect magnetic head (hereinafter called an "MR head") using the magnetoresistance effect device has attracted attention.

The MR head is a magnetic head using the magnetoresistance effect and thus capable of detecting a signal having a lower level. Therefore, the MR head is able to be used even if the magnetic field of the signal is reduced because of shortening of the recording wavelength caused from high density recording.

However, optimum conditions for the operation for reproducing the tape-type magnetic recording medium by using the MR head have not been investigated. Thus, a satisfactory high density recording operation has not been performed.

SUMMARY OF THE INVENTION

Accordingly, an object of the present invention is to provide a tape-type magnetic recording medium for use in a magnetoresistance effect magnetic head and capable of recording signals at a high density and a method of manufacturing the tape-type magnetic recording medium.

Another object of the present invention is to provide a method of reproducing a signal recorded on the tape-type magnetic recording medium by using the magnetoresistance effect magnetic head.

In order to achieve the above-mentioned objects, the inventors of the present invention have performed energetic studies about optimum conditions under which the tape-type magnetic recording medium is reproduced by a shield-type magnetoresistance effect magnetic head. As a result, a fact has been found that an arrangement, in which the residual magnetic flux density per unit area of the surface of the tape-type magnetic recording medium is made to be low and the coercive force is enlarged, enables the tape-type magnetic recording medium to be suitable for a shield-type magnetoresistance effect magnetic head to be obtained. That is, a fact has been found that the product of the residual magnetic flux density of the medium and the film thickness must be reduced to prevent magnetic saturation of the magnetoresistance effect device when the tape-type magnetic recording medium is reproduced by the shield-type magnetoresistance effect magnetic head. Another fact has been found that sharp inversion of magnetization against a self-demagnetizing field corresponding to a short recording wavelength, which is employed in dense recording, can be realized by enlarging the coercive force when the tape-type magnetic recording medium is reproduced by the shield-type magnetoresistance effect magnetic head.

According to one aspect of the present invention, there is provided a tape-type magnetic recording medium including: a non-magnetic support member; and a magnetic layer formed on the non-magnetic support member, wherein relationship $Br\delta \leq Bst/2$ is satisfied when an assumption is made that the residual magnetic flux density of the tape-type magnetic recording medium is Br, the thickness of the magnetic layer is $\delta$, the saturated magnetic flux density of a magnetoresistance effect device for use in a shield-type magnetoresistance effect magnetic head serving as a reproducing head is Bs and the thickness of the same is t, and coercive force Hc of the tape-type magnetic recording medium satisfies $Hc \geq 1500$ (Oe).

According to another aspect of the present invention, there is provided a method of manufacturing a tape-type magnetic recording medium, including the steps of: forming a metal magnetic film on a non-magnetic support member by a diagonal evaporation method arranged to make the minimum incidental angle to be 55° or greater when the tape-type magnetic recording medium in which the magnetic layer is formed on the non-magnetic support member, which has a residual magnetic flux density of Br and the magnetic layer of which has a thickness of $\delta$ is reproduced by a shield-type magnetoresistance effect magnetic head having a magnetoresistance effect device arranged to have a saturated magnetic flux density of Bs and a thickness of t, wherein the magnetic layer satisfies the relationship $Br\delta \leq Bst/2$, and coercive force Hc satisfies $Hc \leq 1500$ (Oe).

According to another aspect of the present invention, there is provided a method of reproducing a signal, including the steps of: reproducing a tape-type magnetic recording medium by a magnetoresistance effect magnetic head by using a magnetoresistance effect magnetic head having a magnetoresistance effect device, the saturated magnetic flux density of which is Bs and a thickness of which is t, and the tape-type magnetic recording medium in which a magnetic layer is formed on a non-magnetic support member, which satisfies the relationship $Br\delta \leq Bst/2$ when an assumption is made that the residual magnetic flux density thereof is Br and the thickness of the magnetic layer is $\delta$ and which has coercive force satisfying the relationship $Hc \geq 1500$ (Oe).

Note that the coercive force Hc is a value measured in an inner direction of the formed film.

Since the tape-type magnetic recording medium according to the present invention satisfies the relationship $Br\delta \leq Bst/2$, the magnetoresistance effect device of the shield-type magnetoresistance effect magnetic head is not saturated. As a result, the shield-type magnetoresistance effect magnetic head can be operated in a range in which the ratio of the resistance of the magnetoresistance effect device is changed linearly. Therefore, the tape-type magnetic recording medium can satisfactorily be reproduced by the shield-type magnetoresistance effect magnetic head.

Since the method of manufacturing the tape-type magnetic recording medium according to the present invention employs the diagonal evaporation method in which the minimum incidental angle is 55° or greater, the self-shadow effect can be improved during the process in which the thin film of the metal magnetic film is grown. Therefore, the formed metal magnetic film has a large portion of the gap therein and thus small saturated magnetization Bs is resulted. As a result, the tape-type magnetic recording medium has the magnetic layer which satisfies the relationship $Br\delta \leq Bst/2$.

If the ratio of the gap in the metal magnetic film is raised, the coercive force of the magnetic layer is considerably enlarged. As a result, the tape-type magnetic recording medium is able to have the magnetic layer having the coercive force satisfying $Hc \geq 1500$ (Oe). Therefore, the above-mentioned tape-type magnetic recording medium is able to realize sharp inversion of magnetization against the self-demagnetizing field corresponding to the short recording wavelength which is employed in a dense recording operation.

The method of reproducing a signal by using the tape-type magnetic recording medium according to the present invention causes the tape-type magnetic recording medium to be reproduced by the shield-type magnetoresistance effect magnetic head in such a manner that the relationship $Br\delta \leq Bst/2$ is satisfied. As a result, the method according to the present invention is able to cause the shield-type magnetoresistance effect magnetic head to satisfactorily reproduce a magnetic signal recorded on the tape-type magnetic recording medium.

Other objects, features and advantages of the invention will be evident from the following detailed description of the preferred embodiments described in conjunction with the attached drawings.

DETAILED DESCRIPTION OF PREFERRED EMBODIMENTS

A tape-type magnetic recording medium, a method of manufacturing the same and a method of reproducing a signal by using the tape-type magnetic recording medium according to the present invention will now be described with reference to the drawings.

Figure 1:
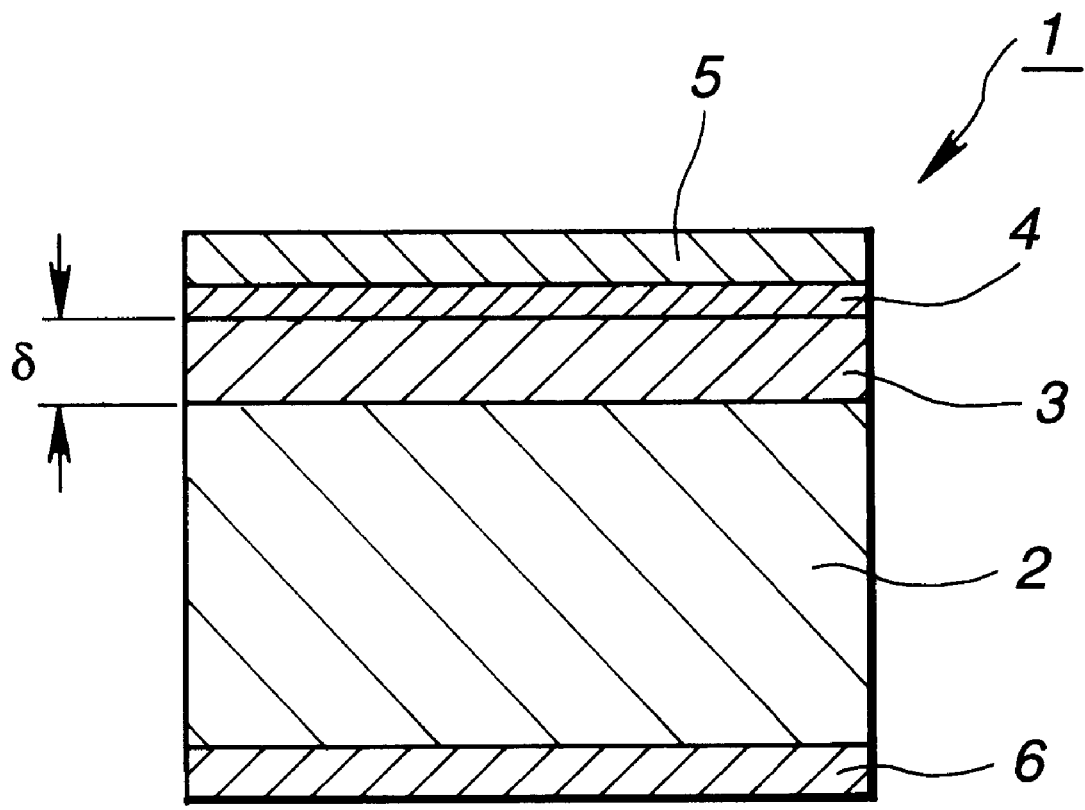
FIG. 1 is a cross sectional view showing a tape-type magnetic recording medium according to the present invention.

A tape-type magnetic recording medium 1 according to this embodiment, as shown in FIG. 1, has a structure formed such that at least a magnetic layer 3 is formed on a non-magnetic support member 2. Moreover, the tape-type magnetic recording medium 1 has a protective film 4 on the magnetic layer 3 thereof. A top-coat layer 5 is formed on the protective film 4. In addition, the tape-type magnetic recording medium 1 has a backcoat layer 6 on the surface of the non-magnetic support member 2 opposite to the surface on which the magnetic layer 3 is formed. Note that the tape-type magnetic recording medium according to the present invention may have a structure in which the protective film 4, the top-coat layer 5 and the backcoat layer 6 are not formed.

The magnetic layer 3 of the tape-type magnetic recording medium 1 is a thin magnetic film which is formed by the diagonal evaporation method as described later, the tape-type magnetic recording medium 1 being formed into a thin film by using a magnetic metal material. The magnetic metal material may be any one of ferromagnetic metal such as Fe, Co or Ni, Co—Ni alloys, Co—Ni—Pt alloys, Fe—Co—Ni alloys, Fe—Ni—B alloys, Fe—Co—B alloys, Fe—Co—Ni—B alloys, Co—Cr alloys (such as Co—Cr—Ta and Co—Cr—Pt).

The magnetic layer 3 has coercive force Hc of about 1500 Oe or greater and arranged to have a small product $Br\delta$ of residual magnetic-flux density Br and the film thickness $\delta$ of the magnetic layer 3. That is, the tape-type magnetic recording medium 1 satisfies the relationship as $Br\delta \leq Bst/2$ when the tape-type magnetic recording medium 1 is reproduced by a shield-type magnetoresistance effect type magnetic head when an assumption is made that the saturated magnetic-flux density is Bs and the thickness is t.

As the non-magnetic support member 2 on which the magnetic layer 3 is formed, a polymer support member is used which is made of a polymer material selected from a group consisting of polyesters, cellulose derivatives, vinyl resins, polyimides, polyamides and polycarbonates.

The protective film 4, which is formed on the magnetic layer 3, may be a carbon film or another film made of $Al_2O_3$, Ti—N, Mo—C, Cr—C, SiO, $SiO_2$ or Si—N. The top-coat layer 5, which is formed on the protective film 4, is made of a rust preventative material or lubricant which may be applied to the surface of the protective film 4 or formed into a thin film. The backcoat layer 6, which is formed on the surface of the non-magnetic support member on which the magnetic layer 3 is formed, is a layer containing dispersed small carbon particles and inorganic pigment for controlling the surface roughness, the backcoat layer 6 being formed in order to improve the moving characteristic of the medium.

The magnetic layer 3 of the tape-type magnetic recording medium 1 having the above-mentioned structure, which is formed by the diagonal evaporation method, has a diagonal axis of easy magnetization with respect to the surface of the non-magnetic support member 2. Therefore, the tape-type magnetic recording medium 1 is able to record a magnetic signal at a density higher than the conventional horizontal recording method.

Since the tape-type magnetic recording medium 1 has the coercive force greater than 1500 Oe, a sharp inversion of magnetization can be performed. That is, the tape-type magnetic recording medium 1 is able to record a magnetic signal to be adaptable to a high density recording operation.

Moreover, the tape-type magnetic recording medium 1 is formed to satisfy the relationship $Br\delta \leq Bst/2$ with the magnetoresistance effect type magnetic head which reproduces the tape-type magnetic recording medium 1. Therefore, the tape-type magnetic recording medium 1 permits the magnetic head to be operated within the limit of the reproducing performance of the magnetic head when the tape-type magnetic recording medium 1 is reproduced by the magnetoresistance effect type magnetic head.

Figure 2:
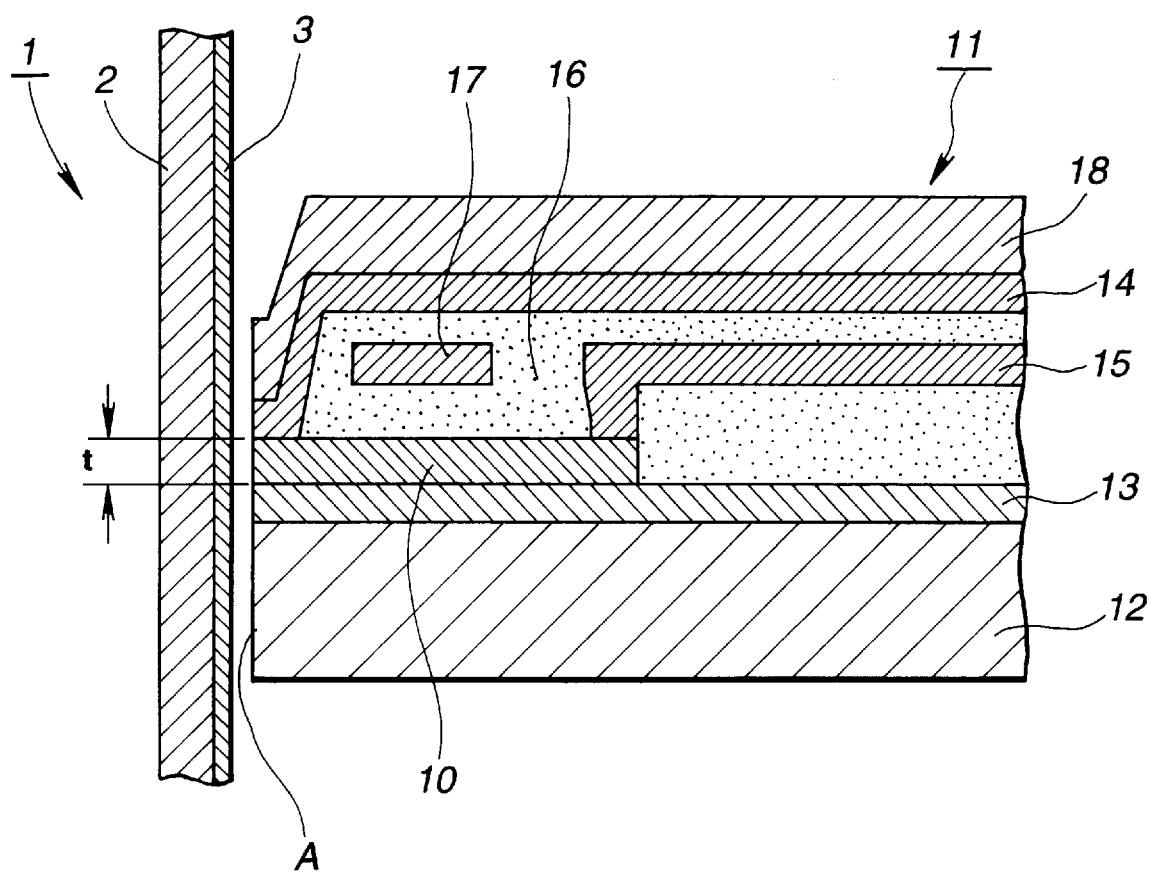
FIG. 2 is a cross sectional view showing an essential portion of a tape-type magnetic recording medium and a vertical MR head.
Figure 3:
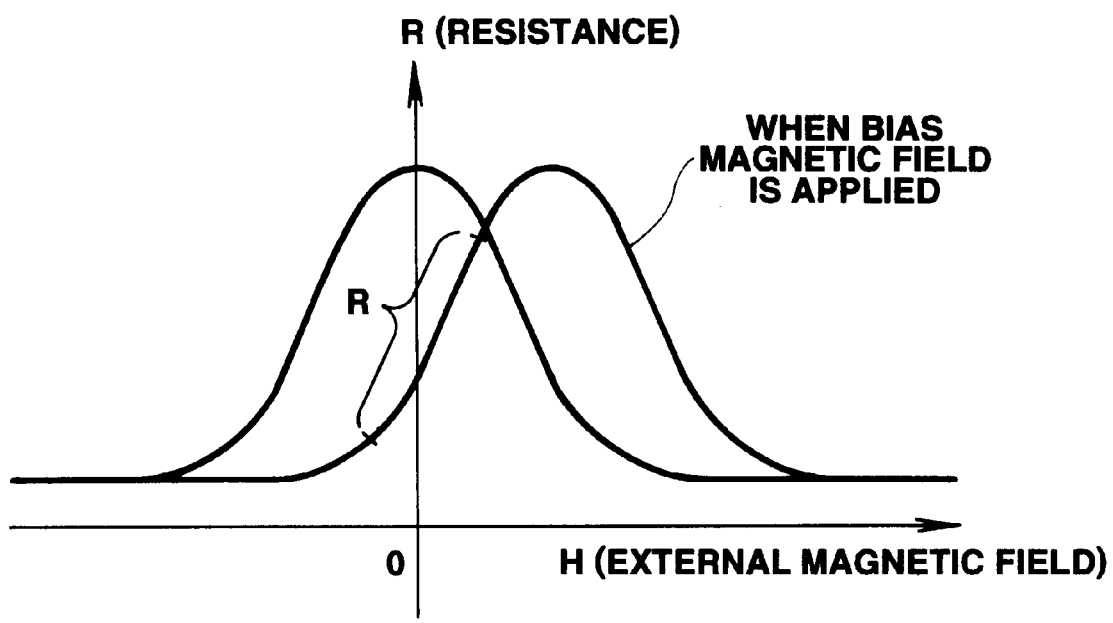
FIG. 3 is a graph of a magnetoresistance effect curve in which an axis of abscissas stands for external magnetic fields and axis of ordinates stands for resistance values of an MR device.

When a magnetic signal recorded on the magnetic layer 3 of the tape-type magnetic recording medium 1 having the above-mentioned structure is reproduced, a magnetoresistance effect type magnetic head 11 (hereinafter called as a "vertical MR head 11") using a magnetoresistance effect device 10 (hereinafter called as an "MR device 10") structured as shown in FIG. 2 is used. The MR device 10 of the vertical MR head 11 serves as a portion for sensing magnetization of a magnetic signal such that the MR device 10 senses the magnetization of a magnetic signal supplied from the tape-type magnetic recording medium 1. When a magnetic signal, which is an external magnetic field, is supplied to the vertical MR head 11, the electric resistance of the MR device 10 is changed, as shown in FIG. 3. Then, the vertical MR head 11 supplies a predetermined sense current sense electric current to the MR device 10 to detect change in the electric resistance as change in the voltage.

The vertical MR head 11 is a so-called shield type magnetoresistance effect magnetic head including a lower shield 12, a lower gap 13 formed on the lower shield 12, the MR device 10 formed on the lower gap 13, a leading-end electrode 14 and a trailing-end electrode 15 respectively formed at the lengthwise directional ends of the MR device 10, a bias magnetic field conductive layer 17 formed above the MR device 10 through a non-magnetic insulation layer 16 and an upper shield 18 formed on the leading-end electrode 14.

Each of the lower shield 12 and the upper shield 18 of the vertical MR head 11 is made of a magnetic material, while each of the lower gap 13 and the leading-end electrode 14 is made of a non-magnetic material. Each of the trailing-end electrode 15 and the bias magnetic field conductive layer 17 of the vertical MR head 11 is made of a conductive material.

The vertical MR head 11 having the above-mentioned structure has a side surface indicated by symbol A shown in FIG. 2 and arranged to be a surface facing the medium so that a magnetic signal recorded on the tape-type magnetic recording medium 1 is reproduced. At this time, the MR device 10 of the vertical MR head 11 serves as a portion for sensing the magnetization so that the magnetic field of the signal supplied from the tape-type magnetic recording medium 1 is applied to the MR device 10. In the vertical MR head 11, a predetermined sense electric current is supplied to the MR device 10 from the trailing-end electrode 15. The sense electric current is supplied to the MR device 10, and then grounded from the leading-end electrode 14.

The MR device 10, having the so-called magnetoresistance effect as shown in FIG. 3 with which the electric resistance of the MR device 10 is changed when a magnetic field is applied to the MR device 10 from outside, causes the voltage to be changed to correspond to the change in the electric resistance when the sense electric current is supplied to the MR device 10. The vertical MR head 11 detects change in the voltage of the sense electric current in accordance with the magnetic field of the signal to reproduce the magnetic signal. At this time, an electric current has been supplied to the bias magnetic field conductive layer 17 of the vertical MR head 11 so that a bias magnetic field has been generated by the bias magnetic field conductive layer 17. When the bias magnetic field is applied to the MR device 10, the resistance of the MR device 10 is changed with excellent linearity.

The vertical MR head 11 is a shield-type magnetoresistance effect magnetic head having the lower shield 12 and the upper shield 18. That is, a magnetic field of a signal which is not the subject of reproduction and which is generated from the tape-type magnetic recording medium 1 is, in the vertical MR head 11, introduced into the lower shield 12 and the upper shield 18. Therefore, only the magnetic field of the signal which is the subject of reproduction among the magnetic fields of signals is, in the vertical MR head 11, applied to the MR device 10.

The vertical MR head 11 and the tape-type magnetic recording medium 1 has the relationship $Br\delta \leq Bst/2$ when an assumption is made that the residual magnetic flux density of the magnetic layer 3 is Br, the thickness of the magnetic layer 3 is δ, the saturated magnetic flux density of the MR device 10 is Bs and the thickness of the MR device 10 is t. Therefore, the tape-type magnetic recording medium 1 does not magnetically saturate the MR device 10 with the generated magnetic field of the signal. That is, the magnetic signal recorded on the tape-type magnetic recording medium 1 does not saturate the MR device 10 and permits the MR device 10 to be operated in a range which is indicated by symbol R shown in FIG. 3 and in which excellent linearity is realized.

The tape-type magnetic recording medium 1 is arranged in such a manner that coercive force Hc of the magnetic layer 3 satisfies $Hc \geq 1500$ (Oe). Thus, the magnetic layer 3 of the tape-type magnetic recording medium 1 is able to perform sharp inversion of magnetization against the magnetic signal when the magnetic signal is recorded on the tape-type magnetic recording medium 1. Therefore, the tape-type magnetic recording medium 1 is able to prevent a problem which arises because the self-demagnetizing field is enlarged as the wavelength of the magnetic signal is shortened. That is, the tape-type magnetic recording medium 1 is able to record magnetic signals which are recorded densely.

The MR device 10 of the vertical MR head 11 may be a so-called GMR head having a giant magnetoresistance effect. Also in this case, the relationship $Br\delta \leq Bst/2$ is required when an assumption is made that the saturated magnetic-flux density of the GMR device is Bs and the thickness is t.

The present invention is not limited to the vertical MR head 11 as the magnetic head for reproducing the tape-type magnetic recording medium 1. The magnetic head may be a lateral-type shield magnetoresistance effect head 21 (hereinafter called as a "lateral MR head 21") structured as shown in FIG. 4.

Figure 4:
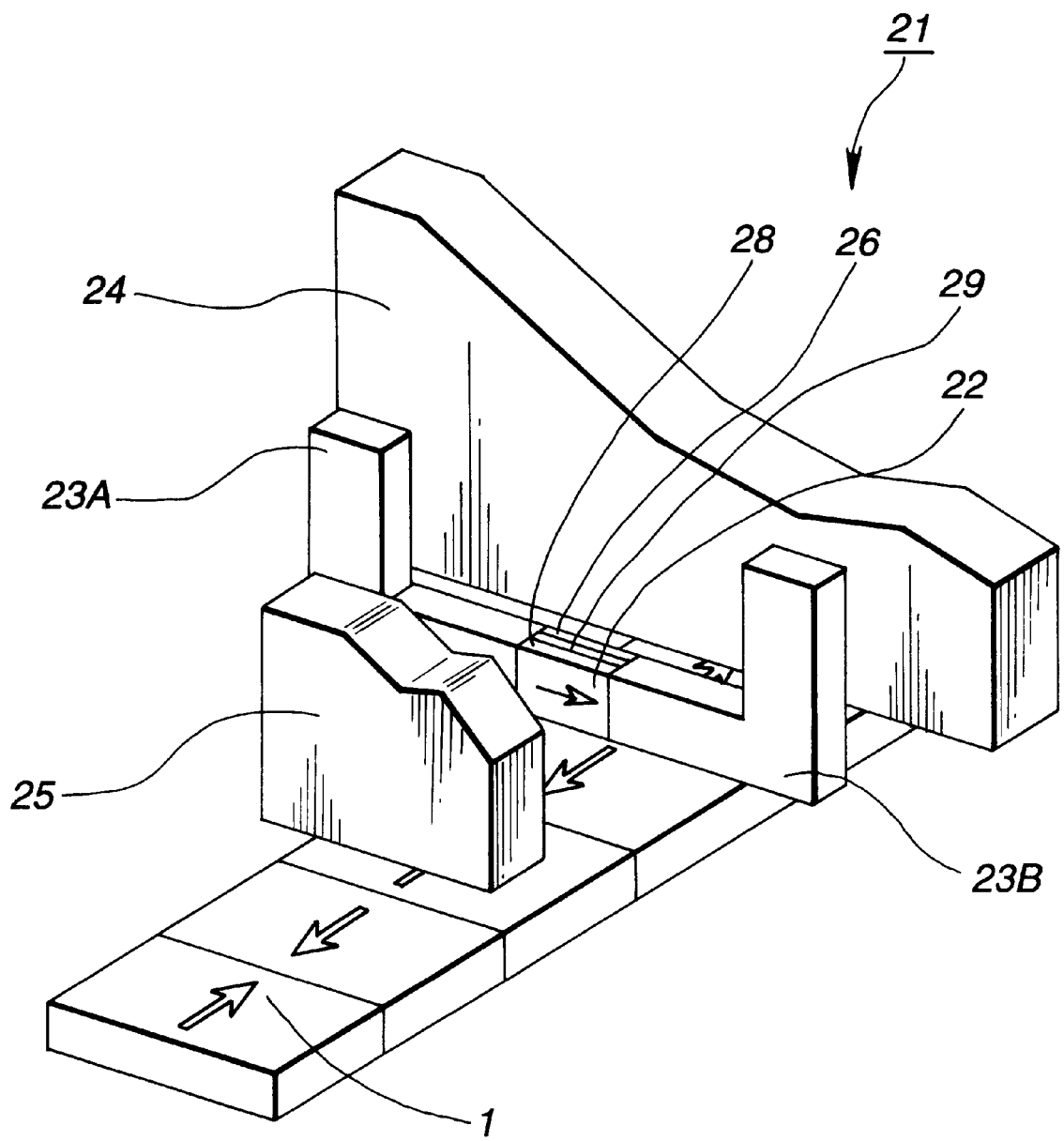
FIG. 4 is a schematic view showing the relationship between the tape-type magnetic recording medium and a lateral MR head.

The lateral MR head 21, as shown in FIG. 4, includes an MR device 22 disposed such that its lengthwise direction runs parallel to the tape-type magnetic recording medium 1, a pair of electrodes 23A and 23B connected to the two lengthwise directional ends of the MR device 22 and an upper shield 24 and a lower shield 25 which are disposed to hold the MR device 22 through a non-magnetic material (not shown). The MR device 22 of the lateral MR head 21 is formed by, through a non-magnetic film 29, stacking a magnetoresistance effect film 26 and a soft magnetic film 28 for applying a bias magnetic field to the magnetoresistance effect film 26.

When the lateral MR head 21 reproduces a magnetic signal recorded on the tape-type magnetic recording medium 1, the magnetoresistance effect film 26 of the MR device 22 serves as a portion for sensing the magnetization. Note that the lateral MR head 21 is arranged in such a manner that the magnetic fields of signals, which are generated from the tape-type magnetic recording medium 1 and which are not the subjects required to be reproduced, are not introduced into the upper shield 24 and the lower shield 25. Therefore, in the lateral MR head 21, only the magnetic field of the signal, required to be reproduced, is applied to the MR device 22.

When the magnetic field of the signal applied to the MR device 22 of the lateral MR head 21 is detected, a predetermined sense electric current is supplied from the pair of the electrodes 23A and 23B. That is, in the lateral MR head 21, the sense electric current flows in parallel to the tape-type magnetic recording medium 1. When the magnetic field of the signal is applied to the MR device 22, the resistance value of the magnetoresistance effect film 26 with respect to the sense electric current is changed. Therefore, supply of a predetermined sense electric current to the MR device 22 enables detection of change in the resistance value of the magnetoresistance effect film 26 occurring because of the magnetic field of the signal to be performed as change in the voltage of the sense electric current.

The MR device 22 has the soft magnetic film 28 formed by stacking in such a manner that the resistance value of the magnetoresistance effect film 26 is substantially linearly changed by the magnetic field of the signal. That is, the soft magnetic film 28 applies a bias magnetic field to the magnetoresistance effect film 26 to determine the direction of magnetization of the magnetoresistance effect film 26. As a result, the resistance of the magnetoresistance effect film 26 is considerably changed with respect to the magnetic field of the signal generated by the tape-type magnetic recording medium 1.

The above-mentioned lateral MR head 21 and the tape-type magnetic recording medium 1 have the relationship $Br\delta \leq Bst/2$ when an assumption is made that the residual magnetic flux density is Br, the thickness of the magnetic layer 3 is $\delta$, the saturated magnetic flux density is Bs and the thickness of the magnetoresistance effect film 26 is t. Therefore, the tape-type magnetic recording medium 1 does not magnetically saturate the magnetoresistance effect film 26 by the magnetic field of the signal generated therefrom. That is, the magnetic signal recorded on the tape-type magnetic recording medium 1 does not magnetically saturate the magnetoresistance effect film 26 to permit an operation within a range indicated by symbol R shown in FIG. 3 in which excellent linearity to be realized.

The tape-type magnetic recording medium 1 is arranged in such a manner that the coercive force Hc of the magnetic layer 3 satisfies $Hc \geq 1500$ (Oe). As a result, the magnetic layer 3 of the tape-type magnetic recording medium 1 is able to realize sharp inversion of magnetization against a magnetic signal when the magnetic signal is recorded. Therefore, the tape-type magnetic recording medium 1 is able to prevent a problem which arises because the self-demagnetizing field is reduced as the wavelength of the magnetic signal is shortened. That is, the tape-type magnetic recording medium 1 is able to record magnetic signals which are recorded densely.

A method of manufacturing the tape-type magnetic recording medium according to the present invention can be employed when the above-mentioned tape-type magnetic recording medium 1 is manufactured. The method of manufacturing the tape-type magnetic recording medium according to the present invention will now be described.

The tape-type magnetic recording medium 1 is formed such that a thin film made of a magnetic metal material for forming the magnetic layer 3 is formed by diagonal evaporation method. The magnetic layer 3 of the tape-type magnetic recording medium 1 is formed by an evaporating apparatus 30 structured as shown in FIG. 5.

The evaporating apparatus 30 includes a cooling can 31 on which the non-magnetic support member 2 runs in such a manner that the surface on which the magnetic layer 3 is formed, a delivery roll 32 around which the non-magnetic support member 2 is wound to deliver the non-magnetic support member 2 to the cooling can 31, a winding roller 33 for winding up the non-magnetic support member 2, a crucible 34 which accommodates the magnetic metal material and a pair of shutters 35 disposed to face the non-magnetic support member 2 which runs along the cooling can 31. The evaporating apparatus 30 is structured such that the pair of the shutters 35 expose only portions of the non-magnetic support member 2. Moreover, the evaporating apparatus 30 further includes a pair of tension rollers 36 for causing the non-magnetic support member 2 to be delivered to the cooling can 31 under a predetermined tension.

The evaporating apparatus 30 is structured in such a manner that the crucible 34 is positioned diagonally with respect to the cooling can 31. That is, the evaporating apparatus 30 is structured in such a manner that a portion of the non-magnetic support member 2 allowed to run along the cooling can 31 and which is exposed by the pair of the shutters 35 and the crucible 34 face each other at a predetermined angle. Specifically, in the evaporating apparatus 30, particles of the magnetic metal material allowed to fly from the crucible 34 are deposited on the exposed portion of the non-magnetic support member 2 at a predetermined incidental angle.

Figure 5:
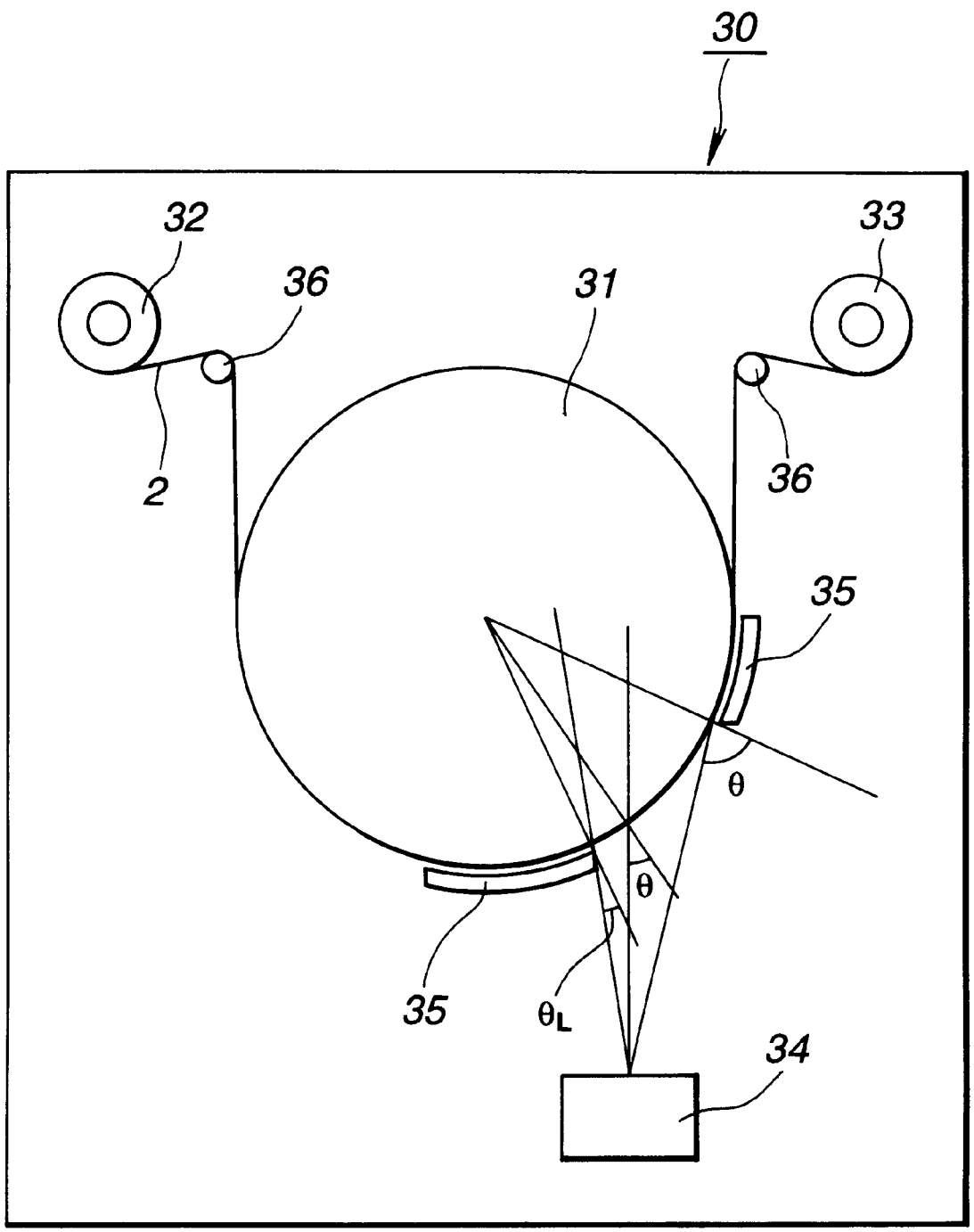
FIG. 5 is a schematic view showing the structure of an evaporating apparatus for use in a method of manufacturing the tape-type magnetic recording medium according to the present invention.

At this time, the incidental angle is an angle indicated by symbol θ shown in FIG. 5 and made by the direction, in which the magnetic metal particles are allowed to fly, and the radial direction. A smallest angle among the incidental angles is made to be minimum incidental angle $\theta_L$. The evaporating apparatus 30 for use in the method of manufacturing the tape-type magnetic recording medium according to the present invention is structured in such a manner that the minimum incidental angle $\theta_L$ is 55° or larger.

When the magnetic layer 3 is formed on the surface of the non-magnetic support member 2 by using the evaporating apparatus 30, the magnetic metal material in the crucible 34 is heated to evaporate the magnetic metal material to the surface of the non-magnetic support member 2. At this time, the evaporating apparatus 30 is able to form the magnetic layer 3 on only the portion exposed to the outside of the non-magnetic support member 2 except for the portions covered by the pair of the shutters 35. Thus, the magnetic layer 3 is sequentially formed on the surface of the non-magnetic support member 2 when the non-magnetic support member 2 is moved from the delivery roll 32 to the winding roller 33.

The magnetic metal material evaporated from the crucible 34 is deposited on the non-magnetic support member 2 to make a predetermined angle because the crucible 34 faces the portion exposed to the outside of the non-magnetic support member 2 to make a predetermined angle. That is, since the evaporating apparatus 30 is structured such that the minimum incidental angle $\theta_L$ of the evaporated magnetic metal material is 55° or greater, particles which are deposited during growth to the thin film have self-shadow effect. The self-shadow effect is a phenomenon in which particles deposited during growth to a thin film are positioned closely and thus particles are hidden behind other particles. The self-shadow effect inhibits deposited particles from growth to a dense thin film, thus resulting in a film having many gaps being formed. Therefore, the magnetic layer 3 is, in the evaporating apparatus 30, formed into a coarse film having many gaps.

Therefore, the tape-type magnetic recording medium 1 includes the magnetic layer 3 having a low saturated magnetic flux density and a low residual magnetic flux density. Moreover, the tape-type magnetic recording medium 1 is formed into a shape in which magnetic particles are spatially separated from one another and thus the coercive force is enlarged. The method according to the present invention is able to easily control the magnetic characteristics of the magnetic layer 3 by adjusting the minimum incidental angle.

Specifically, the method according to the present invention is able to manufacture the tape-type magnetic recording medium 1 which satisfies the relationship Brδ≦Bst/2 when an assumption is made that the residual magnetic flux density of the magnetic layer 3 is Br, the thickness of the magnetic layer 3 is δ, the saturated magnetic flux density of the MR device 10 for reproducing the tape-type magnetic recording medium 1 is Bs and the thickness of the MR device 10 is t. Therefore, the tape-type magnetic recording medium 1 manufactured by the method according to the present invention does not magnetically saturate the MR device 10 of the vertical MR head 11. That is, the magnetic signal recorded on the tape-type magnetic recording medium 1 does not magnetically saturate the MR device 10 of the vertical MR head 11 and cause the MR device 10 to be operated in the region R shown in FIG. 3 in which excellent linearity can be realized.

Moreover, the method according to the present invention is able to manufacture the tape-type magnetic recording medium 1 in such a manner that the magnetic layer 3 has the coercive force Hc satisfying the relationship Hc≧1500 (Oe). As a result, the tape-type magnetic recording medium 1 is able to perform sharp inversion of magnetization when a magnetic signal is recorded on the tape-type magnetic recording medium 1. Thus, the tape-type magnetic recording medium 1 is free from the problem occurring attributable to enlargement of the self-demagnetizing field as the wavelength of the magnetic signal is shortened. That is, the tape-type magnetic recording medium 1 is able to record magnetic signals which are recorded densely.

Moreover, the method of reproducing a signal from the tape-type magnetic recording medium according to the present invention is characterized in that the magnetic layer is formed on the non-magnetic support member and the relationship Brδ≦Bst/2 is satisfied when a signal is reproduced from the tape-type magnetic recording medium having the residual magnetic flux of Br and having the magnetic layer, the thickness of which is δ, by the magnetoresistance effect magnetic head having a magnetoresistance effect device, the saturated magnetization of which is Bs and the thickness of which is t.

That is, the method of reproducing a signal according to the present invention is arranged in such a manner that the tape-type magnetic recording medium 1 having the above-mentioned structure is reproduced by the vertical MR head 11 including the MR device 10 structured to have the change ratio of the resistance as shown in FIG. 3. Since the tape-type magnetic recording medium 1 and the vertical MR head 11 satisfy the relationship Brδ≦Bst/2, the MR device 10 is not magnetically saturated when the MR device 10 reproduces a signal.

Sine the magnetically mutual effect between particles is prevented in the above-mentioned tape-type magnetic recording medium 1, noise can be reduced. Noise of the tape-type magnetic recording medium 1 is, in the vertical MR head 11, adversely affects the SN ratio. As a result, the method of reproducing a signal according to the present invention is able to realize a high SN ratio because noise of the tape-type magnetic recording medium 1 can be reduced.

EXAMPLES

The tape-type magnetic recording mediums 1 according to the present invention were manufactured to evaluate the characteristics of the sample mediums. Tape-type magnetic recording mediums according to Examples 1 to 5 were manufactured, and those according to Comparative Examples 1 to 5 were manufactured to make comparisons.

In each of the examples and comparative examples, a polymer film was employed as the non-magnetic support member 2, and then the magnetic layer 3 was formed on one of the surfaces of the polymer film. When the magnetic layer 3 is formed, the evaporating apparatus 30 was used to evaporate the magnetic metal material by the diagonal evaporation method as shown in FIG. 5 so as to form the magnetic layer 3. The magnetic metal material was Co in the examples and the comparative examples.

The conditions under which the films were formed were as follows:

| Conditions Under Which Films were Formed | |
| --- | --- |
| Ingot | $Co_{100}$ |
| Incidental Angle | 55° to 90° |
| Quantity of Introduced Oxygen | 0.2 l/min to 0.51 l/min |
| Degree of Vacuum | $2 \times 10^{-2}$ Pa |

The magnetic layer 3 is formed on the non-magnetic support member 2 under the above-mentioned conditions in such a way that Co particles are deposited as the magnetic particles and Co-O particles are deposited as the non-magnetic particles. The thus-formed magnetic layer 3 has the axis of easy magnetization which is inclined by 20° to 30° from the surface of the non-magnetic support member 2. Note that the thickness of the magnetic layer 3 was controlled by changing the speed at which the tape was moved or by changing electric power which was supplied from an electronic gun.

Then, the carbon protective film 4 was formed on the magnetic layer 3 to make the thickness of the protective film 4 to be about 8 nm. Then, the top-coat layer 5 was formed on the carbon protective film 4. Moreover, the backcoat layer 6 was formed on the surface of the non-magnetic support member 2 opposite to the surface on which the magnetic layer 3 was formed. Then, the formed tape was cut into portions each having a predetermined width so that the tape-type magnetic recording mediums 1 were manufactured.

The conditions under which the magnetic layer 3 was formed were varied so that the magnetic characteristics of the magnetic layer 3 were changed. Specifically, the minimum incidental angle $\theta_L$ was varied to control the residual magnetic flux density and the coercive force. Results of control of the residual magnetic flux and the coercive force of the magnetic layer 3 were shown in Tables 1 and 2. Table 1 shows results in a case where the thickness of the magnetic layer 3 was 100 nm, while Table 2 shows results in a case where the thickness of the magnetic layer 3 was 50 nm.

TABLE 1

| Film Thickness δ: 100 [nm] | | | | |
| --- | --- | --- | --- | --- |
| | 45°–90° | 50°–90° | 55°–90° | 60°–90° |
| Bs [G] | 5650 | 3640 | 3000 | 2500 |
| Br [G] | 4140 | 2950 | 2010 | 1760 |
| Hc//[Oe] | 1400 | 1700 | 1950 | 2000 |
| Brδ [G · μm] | 410 | 295 | 200 | 180 |

TABLE 2

| Film Thickness δ: 50 [nm] | | | | |
| --- | --- | --- | --- | --- |
| | 45°–90° | 50°–90° | 55°–90° | 60°–90° |
| Bs [G] | 5400 | 3640 | 2900 | 2500 |
| Br [G] | 4080 | 2900 | 1950 | 1760 |
| Hc//[Oe] | 1350 | 1500 | 1650 | 1700 |
| Brδ [G · μm] | 205 | 145 | 100 | 88 |

As can be understood from Tables 1 and 2, the saturated magnetic flux density is lowered in inverse proportion to the minimum incidental angle. That is, a fact can be understood that the magnetic characteristics of the magnetic layer 3 can be controlled by controlling the minimum incidental angle.

The magnetic characteristics were controlled when the samples according to Examples 1 to 5 and Comparative Examples 1 to 5 were manufactured. The electromagnetic conversion characteristic of each sample was measured. Magnetic signals were recorded on each sample by using a MIG (Metal in Gap) head having a gap length of 0.22 μm and a track width of 86 μm. Note that the recording wavelength of the magnetic signal was made to be 0.3 μm which was a wavelength considered to be used in the very dense recording operation in the future.

The electromagnetic conversion characteristic was measured by using an MR head A serving as the MR device 10 and containing Ni—Fe and a GMR head B serving as the MR device 10 and exhibiting a giant magnetoresistance effect. The MR head A included an MR device having a track width of 5 μm and Bst/2=200 (G·μm). The GMR head B included an MR device having a track width of 5 μm and Bst/2=100 (G·μm). The head efficiency of each of the MR head A and the GMR head B was made to be about 0.4. Note that the tape speed was determined to be 1 m/minute which was the relative speed when the electromagnetic conversion characteristic was measured.

The MR head A and the GMR head B were used in the reproducing operations to measure the SN ratio of each sample. Samples according to Examples 1 to 3 and the Comparative Examples 1 to 3 were reproduced by the MR head A. Results were shown in Table 3. Examples 4 and 5 and the Comparative Examples 4 and 5 were reproduced by the GMR head B. Results were shown in Table 4. The magnetic characteristics were measured by a vibration-sample-type magnetometer. The SN ratio was measured in such a way that the signal was made to be peak-to-peak voltage and noise was rms value.

TABLE 3

Recording Wavelength: 0.3 μm
Head: Shield-Type Ni-FeMR Head
Bs of Head: 10 [kG], t: 0.04 [μm]
Bs · t/2 = 200 [G · μm]
Head Efficiency: 0.4

| | Brδ [G · μm] | Hc//[Oe] | SN Ratio [dB] |
| --- | --- | --- | --- |
| Example 1 | 70 | 1500 | 21.0 |
| Example 2 | 140 | 1800 | 22.1 |
| Example 3 | 190 | 1750 | 23.7 |
| Comparative Example 1 | 300 | 1800 | 16.1 |
| Comparative Example 2 | 750 | 1750 | 15.0 |
| Comparative Example 3 | 150 | 1200 | 19.0 |

TABLE 4

Recording Wavelength: 0.3 μm
Head: Spin-Valve-Type GMR Head
Bs of Head: Bs · t/2 = 100 [G · μm]
Head Efficiency: 0.4

| | Brδ [G · μm] | Hc//[Oe] | SN Ratio [dB] |
| --- | --- | --- | --- |
| Example 4 | 70 | 1500 | 21.0 |
| Example 5 | 100 | 1700 | 22.0 |
| Comparative Example 4 | 200 | 1750 | 18.5 |
| Comparative Example 5 | 100 | 1200 | 19.2 |

As can be understood from Tables 3 and 4, excellent electromagnetic conversion characteristic was realized when the SN ratio was 20 dB or higher. The value of SN ratio not lower than 20 dB corresponds to an error rate of $5\times10^{-7}$ in the evaluation system in this example. Therefore, the value of the SN ratio not lower than 20 dB is a satisfactory error rate in a usual data media.

As can be understood from Tables 3 and 4, the tape-type magnetic recording medium has an excellent electromagnetic conversion characteristic when the magnetic layer 3 and the MR head for reproducing the tape-type magnetic recording medium satisfy the relationship $Br\delta \leq Bst/2$ and when the coercive force of the magnetic layer 3 is 1500 Oe or greater.

As described above, the tape-type magnetic recording medium according to the present invention satisfies the relationship $Br\delta \leq Bst/2$ when the tape-type magnetic recording medium is reproduced by a shield-type magnetoresistance effect magnetic head having the magnetoresistance effect device arranged to have the saturate magnetic flux density of Bs and the thickness of t. As a result, the tape-type magnetic recording medium according to the present invention can be reproduced by the shield-type magnetoresistance effect magnetic head with excellent SN ratio.

The method of manufacturing the tape-type magnetic recording medium according to the present invention is arranged in such a way that the minimum incidental angle when the magnetic layer is formed is made to be 55° or greater. Therefore, the method according to the present invention is able to manufacture the tape-type magnetic recording medium having the above-mentioned magnetic characteristics.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A magnetic recording tape comprising:
    a non-magnetic support layer; and
    a magnetic layer formed on said non-magnetic support layer;
    wherein,
        a relationship $Br\delta \leq Bst/2$ is satisfied when an assumption is made that the residual magnetic flux density of said magnetic recording tape medium is Br, the thickness of said magnetic layer is $\delta$, the saturated magnetic flux density of a magnetoresistance effect device for use in a shielded magnetoresistance effect magnetic head serving as a reproducing head is Bs and the thickness of the same is t, and
        a coercive force Hc of said magnetic recording tape medium satisfies $Hc \geq 1500$ (Oe).

2. A magnetic recording tape medium according to claim 1, wherein
    said magnetic layer has a metal magnetic film formed by a diagonal evaporation method to have an axis of easy magnetization which is diagonal with respect to the surface of said non-magnetic support layer.

3. A method of manufacturing a magnetic recording tape medium, comprising the steps of:
    forming a metal magnetic film on a non-magnetic support layer by a diagonal evaporation method arranged to make the minimum incidental angle to be 55° or greater when said magnetic recording tape medium in which said magnetic layer is formed on said non-magnetic support layer, which has a residual magnetic flux density of Br and said magnetic layer of which has a thickness of $\delta$ is reproduced by a shielded magnetoresistance effect magnetic head having a magnetoresistance effect device arranged to have a saturated magnetic flux density of Bs and a thickness of t, wherein said magnetic layer satisfies the relationship $Br\delta \leq Bst/2$, and has coercive force Hc satisfies $Hc \geq 1500$ (Oe).

4. A method of reproducing a magnetic signal, comprising the steps of:
    moving a magnetic recording tape medium relative to magnetoresistance effect magnetic head having a magnetoresistance effect device, the saturated magnetic flux density of which is Bs and a thickness of which is t; and
    picking up and reproducing magnetic signals in said magnetic tape medium with said head; wherein,
        said magnetic recording tape medium having a magnetic layer formed on a non-magnetic support layer, which satisfies the relationship $Br\delta \leq Bst/2$ when an assumption is made that the residual magnetic flux density thereof is Br and the thickness of said magnetic layer is $\delta$ and which has a coercive force Hc satisfying the relationship $Hc \geq 1500$ (Oe).

* * * * *